United States Patent
Hubbard

(10) Patent No.: US 9,132,782 B2
(45) Date of Patent: Sep. 15, 2015

(54) BRACKET AND A CROSSBAR ASSEMBLY FOR A ROOF RACK

(75) Inventor: Peter Douglas Hubbard, Christchurch (NZ)

(73) Assignee: Hubco Automotive Limited, Auckland (NZ)

( * ) Notice: Subject to any disclaimer, the term of this patent is extended or adjusted under 35 U.S.C. 154(b) by 556 days.

(21) Appl. No.: 13/063,842

(22) PCT Filed: Sep. 15, 2009

(86) PCT No.: PCT/NZ2009/000194
§ 371 (c)(1),
(2), (4) Date: Apr. 8, 2011

(87) PCT Pub. No.: WO2010/030198
PCT Pub. Date: Mar. 18, 2010

(65) Prior Publication Data
US 2011/0174853 A1    Jul. 21, 2011

(30) Foreign Application Priority Data
Sep. 15, 2008   (NZ) .................................... 571287

(51) Int. Cl.
*B60R 9/058*   (2006.01)
*B60R 9/045*   (2006.01)

(52) U.S. Cl.
CPC ................. *B60R 9/058* (2013.01); *B60R 9/045* (2013.01)

(58) Field of Classification Search
CPC .......... B60R 9/058; B60R 9/048; B60R 9/045
USPC ......... 224/322, 323, 331, 330, 329, 319, 325, 224/309, 314, 321, 326; 248/316.4, 316.5
See application file for complete search history.

(56) References Cited

U.S. PATENT DOCUMENTS

| | | | |
|---|---|---|---|
| 3,606,432 A | 9/1971 | Honatzis | |
| 3,677,451 A * | 7/1972 | Burland | ........................ 224/322 |
| 3,858,774 A | 1/1975 | Friis | |
| 4,245,764 A | 1/1981 | Kowalski et al. | |
| 4,264,025 A | 4/1981 | Ferguson et al. | |
| 4,274,570 A | 6/1981 | Bott | |
| 4,277,009 A | 7/1981 | Bott | |
| 4,449,656 A | 5/1984 | Wouden | |

(Continued)

FOREIGN PATENT DOCUMENTS

AU     2003231667 A1 *   2/2004
AU     2006100386 A4      4/2006

(Continued)

OTHER PUBLICATIONS

International Search Report mailed Dec. 7, 2009 of International Application No. PCT/NZ2009/000194, 4 pages.

(Continued)

*Primary Examiner* — J. Gregory Pickett
*Assistant Examiner* — Todd Anderson
(74) *Attorney, Agent, or Firm* — Kolisch Hartwell, P.C.

(57) ABSTRACT

A crossbar assembly is provided for a cargo rack configured for mounting on top of a vehicle. A crossbar assembly may include a pair of brackets, each bracket having a crossbar housing, for receiving and engaging one end of a crossbar. The housing may also include a pair of jaws adapted to clamp a rail on top of a vehicle.

15 Claims, 7 Drawing Sheets

(56) References Cited

U.S. PATENT DOCUMENTS

| | | | |
|---|---|---|---|
| 4,487,348 A | 12/1984 | Mareydt | |
| 4,586,638 A | 5/1986 | Prescott et al. | |
| 4,588,117 A | 5/1986 | Bott | |
| 4,640,450 A | 2/1987 | Gallion et al. | |
| 4,684,049 A | 8/1987 | Maby et al. | |
| 4,702,398 A | 10/1987 | Seager | |
| 4,721,239 A | 1/1988 | Gibbs, III et al. | |
| D294,340 S | 2/1988 | Robson | |
| 4,757,929 A | 7/1988 | Nelson | |
| 4,778,092 A | 10/1988 | Grace | |
| 4,789,145 A | 12/1988 | Wenrich | |
| 4,877,169 A | 10/1989 | Grim | |
| 4,911,348 A | 3/1990 | Rasor et al. | |
| 4,993,615 A | 2/1991 | Arvidsson | |
| 4,995,538 A | 2/1991 | Marengo | |
| 5,025,967 A | 6/1991 | Cronce et al. | |
| 5,038,988 A | 8/1991 | Thulin | |
| 5,201,487 A | 4/1993 | Epplett | |
| 5,203,483 A | 4/1993 | Cucheran | |
| 5,207,365 A | 5/1993 | Bott | |
| 5,226,634 A | 7/1993 | Rudy, Jr. et al. | |
| 5,257,710 A | 11/1993 | Cropley | |
| 5,282,560 A | 2/1994 | Ozog | |
| 5,282,562 A | 2/1994 | Legault | |
| 5,294,033 A | 3/1994 | Duemmler | |
| 5,314,104 A | 5/1994 | Lee | |
| 5,320,264 A | 6/1994 | Weir | |
| 5,443,190 A * | 8/1995 | Cucheran et al. | 224/405 |
| 5,456,512 A | 10/1995 | Gibbs et al. | |
| 5,471,714 A | 12/1995 | Olson | |
| 5,474,218 A * | 12/1995 | Arsenault et al. | 224/316 |
| 5,492,258 A | 2/1996 | Brunner | |
| 5,499,762 A | 3/1996 | Lee | |
| 5,553,761 A | 9/1996 | Audoire et al. | |
| 5,826,765 A | 10/1998 | Rak et al. | |
| 5,845,828 A | 12/1998 | Settelmayer | |
| 5,924,614 A | 7/1999 | Kuntze et al. | |
| 5,984,155 A * | 11/1999 | Stapleton | 224/321 |
| 6,010,048 A | 1/2000 | Settelmayer | |
| 6,102,265 A | 8/2000 | Stapleton | |
| 6,105,841 A * | 8/2000 | Aftanas | 224/321 |
| 6,176,404 B1 | 1/2001 | Fourel | |
| 6,182,876 B1 | 2/2001 | Moliner | |
| 6,273,311 B1 | 8/2001 | Pedrini | |
| 6,276,747 B1 | 8/2001 | Ogawa et al. | |
| 6,279,802 B1 | 8/2001 | Hickman et al. | |
| 6,557,931 B1 | 5/2003 | Tremmel et al. | |
| 6,662,982 B1 | 12/2003 | Päkkilä | |
| 6,722,541 B1 | 4/2004 | Aftanas et al. | |
| 6,779,696 B2 | 8/2004 | Aftanas et al. | |
| 6,796,471 B2 | 9/2004 | Aftanas et al. | |
| 6,817,500 B2 | 11/2004 | Neaux | |
| 6,845,893 B2 | 1/2005 | Nelson | |
| 6,845,922 B2 | 1/2005 | Stark | |
| 6,905,053 B2 | 6/2005 | Allen | |
| 7,182,233 B1 | 2/2007 | Graffy et al. | |
| 7,201,436 B2 | 4/2007 | Ludwig et al. | |
| 7,328,824 B2 | 2/2008 | Smith et al. | |
| 7,641,249 B2 | 1/2010 | Jung | |
| 7,721,925 B1 | 5/2010 | Graffy et al. | |
| 8,087,557 B2 | 1/2012 | Larsson et al. | |
| 8,104,651 B2 | 1/2012 | Bingham | |
| 8,333,311 B2 | 12/2012 | Hubbard | |
| 8,393,508 B2 | 3/2013 | Sautter et al. | |
| 8,544,707 B2 | 10/2013 | Hubbard | |
| 2003/0178457 A1 | 9/2003 | Wang | |
| 2004/0118886 A1 | 6/2004 | Mirshafiee et al. | |
| 2004/0211801 A1 | 10/2004 | Barbara | |
| 2005/0029320 A1 | 2/2005 | Chimenti et al. | |
| 2006/0049324 A1 | 3/2006 | Smith et al. | |
| 2006/0208022 A1 | 9/2006 | Karlsson | |
| 2006/0273123 A1 | 12/2006 | Settelmayer | |
| 2007/0036628 A1* | 2/2007 | Womack et al. | 410/104 |
| 2007/0108243 A1 | 5/2007 | Bingham | |
| 2008/0257924 A1 | 10/2008 | Kmita et al. | |
| 2009/0159624 A1 | 6/2009 | Johnson et al. | |
| 2010/0237116 A1 | 9/2010 | Hubbard | |
| 2010/0282799 A1 | 11/2010 | Hubbard | |
| 2010/0308091 A1 | 12/2010 | Hubbard | |
| 2013/0200121 A1 | 8/2013 | Hubbard | |
| 2013/0284779 A1 | 10/2013 | Sautter et al. | |
| 2014/0028007 A1 | 1/2014 | Pfeiffer et al. | |

FOREIGN PATENT DOCUMENTS

| | | | |
|---|---|---|---|
| CN | 101559737 A | | 10/2009 |
| CN | 101559738 A | | 10/2009 |
| CN | 101868375 A | | 10/2010 |
| CN | 101868376 A | | 10/2010 |
| CN | 102177047 A | | 9/2011 |
| CN | 101861257 B | | 11/2012 |
| DE | 3209912 A1 | | 10/1983 |
| DE | 3637856 A1 | | 5/1988 |
| DE | 202005007566 U1 | | 7/2005 |
| EP | 0151907 A2 | | 8/1985 |
| EP | 193501 A2 | * | 9/1986 |
| EP | 0646074 B1 | | 10/1996 |
| EP | 0398885 B2 | | 6/1997 |
| EP | 0945307 A2 | | 9/1999 |
| EP | 1205358 A1 | | 5/2002 |
| EP | 1340652 A1 | | 9/2003 |
| EP | 1712420 A1 | | 10/2006 |
| EP | 2200869 B1 | | 4/2014 |
| FR | 2632595 A1 | | 12/1989 |
| GB | 1045619 A | | 10/1966 |
| GB | 1311367 A | | 3/1973 |
| GB | 2277309 A | | 10/1994 |
| GB | 2303344 A | | 2/1997 |
| JP | 10250488 A | * | 9/1998 |
| WO | 9110581 A1 | | 7/1991 |
| WO | 9954168 A1 | | 10/1999 |
| WO | 2009038479 A1 | | 3/2009 |
| WO | 2009038480 A | | 3/2009 |
| WO | 2009041828 A1 | | 4/2009 |
| WO | 2010030198 A1 | | 3/2010 |
| WO | 2014022435 A1 | | 2/2014 |

OTHER PUBLICATIONS

Notification of Transmittal of International Preliminary Report on Patentability mailed Dec. 16, 2010 of International Application No. PCT/NZ2009/000194, 9 pages.
Canadian Intellectual Property Office, Office action regarding Canadian Patent Application No. 2,773,358, Aug. 23, 2013, 2 pages.
U.S. Patent and Trademark Office, Office action regarding U.S. Appl. No. 13/719,144, Aug. 1, 2013, 13 pages.
European Patent Office, Examination Report regarding European Patent Application No. 08834554.1, Jul. 24, 2013, 4 pages.
U.S. Patent and Trademark Office, Office action regarding U.S. Appl. No. 12/679,580, dated Jul. 1, 2014, 34 pages.
Australian Receiving Office of WIPO, International Search Report and Written Opinion of the International Searching Authority relating to PCT Application No. PCT/NZ2008/000235, Jan. 7, 2009, 7 pages.
Australian Receiving Office of WIPO, International Search Report and Written Opinion of the International Searching Authority relating to PCT Application No. PCT/NZ2008/000236, Jan. 7, 2009, 6 pages.
Australian Receiving Office of WIPO, International Search Report and Written Opinion of the International Searching Authority relating to PCT Application No. PCT/NZ2008/000238, Jan. 14, 2009, 7 pages.
The Internatioanl Bureau of WIPO, International Preliminary Report on Patentability regarding PCT Patent Application No. PCT/NZ2008/000235, Jul. 28, 2009, 7 pages.
Australian Receiving Office of WIPO, Written Opinion of the International Searching Authority relating to PCT Application No. PCT/NZ2009/000194, Dec. 7, 2009, 9 pages.
The International Bureau of WIPO, International Preliminary Report on Patentability regarding PCT Patent Application No. PCT/NZ2008/000238, Jan. 11, 2010, 5 pages.
The International Bureau of WIPO, International Preliminary Report on Patentability regarding PCT Patent Application No. PCT/NZ2008/000236, Mar. 24, 2010, 6 pages.

(56) References Cited

OTHER PUBLICATIONS

Australian Receiving Office of WIPO, Written Opinion of the International Preliminary Examining Authority regarding PCT Application No. PCT/NZ2009/000194, Jul. 20, 2010, 5 pages.
State Intellectual Property Office of the P.R.C., Office Action regarding Chinese Patent Application No. 200880116598.3, Oct. 10, 2011, 6 pages.
European Patent Office, Extended European Search Report regarding European Patent Application No. 08831383.8, Oct. 19, 2011, 4 pages.
State Intellectual Property Office of the P.R.C., Office Action regarding Chinese Patent Application No. 200880117299.1, Nov. 23, 2011, 15 pages.
State Intellectual Property Office of the P.R.C., Office Action regarding Chinese Patent Application No. 200880116798.9, Dec. 7, 2011, 14 pages.
European Patent Office, Extended European Search Report regarding European Patent Application No. 09813293.9, Jan. 2, 2012, 5 pages.
European Patent Office, Extended European Search Report regarding European Patent Application No. 08831692.2, Feb. 29, 2012, 6 pages.
State Intellectual Property Office of the P.R.C., Office Action regarding Chinese Patent Application No. 200880116798.9, May 24, 2012, 8 pages.
U.S. Patent and Trademark Office, Office Action regarding U.S. Appl. No. 12/679,580, May 25, 2012, 18 pages.
U.S. Patent and Trademark Office, Office Action regarding U.S. Appl. No. 12/679,434, Jun. 6, 2012, 18 pages.
State Intellectual Property Office of the P.R.C., Office Action regarding Chinese Patent Application No. 200880117299.1, Jun. 19, 2012, 7 pages.
U.S. Patent and Trademark Office, Office Action regarding U.S. Appl. No. 12/679,431, Jul. 5, 2012, 9 pages.
Australian Patent Office, Examination Report regarding Australian Patent Application No. 2008301329, Jul. 10, 2012, 2 pages.
Australian Patent Office, Examination Report regarding Australian Patent Application No. 2008301330, Oct. 17, 2012, 4 pages.
Australian Patent Office, Examination Report regarding Australian Patent Application No. 2008304016, Oct. 22, 2012, 3 pages.
European Patent Office, Examination Report regarding European Patent Application No. 08831692.2, Nov. 2, 2012, 4 pages.
European Patent Office, Extended European Search Report regarding European Patent Application No. 08834554.1, Nov. 16, 2012, 6 pages.
Canadian Intellectual Property Office, Office Action regarding Canadian Patent Application No. 2,737,790, Feb. 1, 2013, 2 pages.
State Intellectual Property Office of the P.R.C., Office Action regarding Chinese Patent Application No. 200880117299.1, Feb. 6, 2013, 7 pages.
Canadian Intellectual Property Office, Office Action regarding Canadian Patent Application No. 2,739,194, Feb. 7, 2013, 3 pages.
European Patent Office, Examination Report regarding European Patent application No. 08831383.8, Feb. 14, 2013, 4 pages.
State Intellectual Property Office of the P.R.C., Office Action regarding Chinese Patent Application No. 200980139840.3, Feb. 28, 2013, 9 pages.
U.S. Patent and Trademark Office, Office Action regarding U.S. Appl. No. 12/679,580, Mar. 1, 2013, 14 pages.
U.S. Patent and Trademark Office, Office Action regarding U.S. Appl. No. 12/679,431, Mar. 28, 2013, 10 pages.
State Intellectual Property Office of the P.R.C., Office Action regarding Chinese Patent Application No. 200880117299.1, May 17, 2013, 20 pages.
U.S. Patent and Trademark Office, Office Action regarding U.S. Appl. No. 12/679,580, Sep. 27, 2013, 28 pages.
State Intellectual Property Office of the P.R.C., Office Action regarding Chinese Patent Application No. 200880117299.1, Oct. 21, 2013, 16 pages.
State Intellectual Property Office of the P.R.C., Office Action regarding Chinese Patent Application No. 200980139840.3, Oct. 22, 2013, 17 pages.
The International Bureau of WIPO, International Search Report and Written Opinion of the International Searching Authority relating to PCT Application No. PCT/US13/52785, Jan. 7, 2014, 15 pages.
U.S. Patent and Trademark Office, Office Action regarding U.S. Appl. No. 14/042,560, Apr. 10, 2014, 14 pages.
State Intellectual Property Office of the P.R.C., Office Action regarding Chinese Patent Application No. 200980139840.3, Apr. 15, 2014, 11 pages.
U.S. Patent and Trademark Office, Office Action regarding U.S. Appl. No. 13/954,897, Apr. 24, 2014, 10 pages.
U.S. Patent and Trademark Office, Office Action regarding U.S. Patent Application Serial No. 13/719,144, May 15, 2014, 19 pages.

* cited by examiner

BRACKET AND A CROSSBAR ASSEMBLY FOR A ROOF RACK

FIELD OF APPLICATION

The present application relates to a vehicle roof rack or load carrier.

BACKGROUND

Roof racks are well known and are manufactured in a variety of configurations. One conventional roof rack assembly includes first and second roof rails mounted in a spaced apart and substantially parallel arrangement on opposite sides of the roof of a vehicle. Often, such rails are attached to a vehicle roof during manufacture and assembly of the vehicle. One or more crossbars, usually two, typically extend substantially perpendicularly between the roof rails and attach to the roof rails.

According to conventional designs, crossbars are configured to be positioned perpendicular to the roof rails to which they connect. The brackets used to couple or attach the crossbars to roof rails provide for no flexibility or variation in this configuration. However, in practice, roof rails sometimes deviate from being parallel. This may be as a result of manufacturing imperfections or tolerances and/or any damage to the roof rails, such as through bending of the rails. These problems are exacerbated when crossbars are positioned at different points along the lengths of the roof rails, such as by moving the crossbars from one point along the length of the roof rail to another point by sliding the crossbars along the roof rails. Thus, although the ability to move the crossbars along the length of the roof rails provides improved flexibility for users, a crossbar of fixed length will not be able to attach to a point on a roof rail that is spaced too far apart from, or too close together to, the opposing roof rail.

Such requirements have previously restricted vehicle designers to arrangements in which the rails are substantially parallel, which may not always be desired, at least for aesthetic reasons.

Furthermore, conventional designs have been somewhat difficult to fit to a vehicle, and are sometimes not only time-consuming, but are also frustrating for users. This, is particularly the case where it is desired to install or remove crossbars for a roof rack on a regular basis. Generally, prior art arrangements require a first step of fixing a bracket to a roof rail and then a second step of fixing a crossbar to the bracket.

SUMMARY

In broad terms, there is described a bracket for coupling a crossbar to a pair of roof rack rails or roof rails. Particular embodiments provide for flexibility in the orientation of one rail relative to the other, namely, the rails may be other than parallel to one another. Preferred embodiments further simplify installation as will become apparent.

According to some embodiments, there is provided a bracket for a crossbar assembly for a roof rack, the bracket comprising a crossbar housing for receiving and engaging one end of a crossbar; and rail engaging means for coupling the bracket to a fixed roof rail. The rail engaging means comprises first and second jaws; and, means for urging at least one of the jaws towards the other so as to grip the rail.

Preferably, the first jaw is fixed in position and the second jaw is movable relative to the first jaw.

More preferably, the second jaw is pivotable or hinged, relative to the first jaw, about a first axis so as to enable the first and second jaws to move apart or towards each other and to enable gripping of the rail.

Preferably, the second jaw comprises a body having first and second ends, the first end being configured to engage the roof rail and the body being pivotable about the first axis at the second end. Preferably, the second end is configured to engage a profiled surface.

The profiled surface improves the strength of the connection or joint between the second jaw and the crossbar by helping to prevent the second end from slipping and also by acting as a strut which helps to prevent buckling of the crossbar under load.

The profiled surface further provides one or more discrete pivot points for the second end of the second jaw.

Preferably, the second jaw is pivotable relative to the first jaw about a second axis.

Preferably, the second axis is substantially perpendicular to the first axis.

Preferably, the means for urging at least one jaw towards the other comprises a threaded shaft configured to engage a threaded bore, wherein rotation of one of the shaft or the bore is inhibited; one of the first and second jaws is fixed in position relative to the shaft in the direction along its main axis; and the other one of the first and second jaws is fixed in position relative to the bore in the direction of the main axis of the shaft, whereby rotation in a first direction, of whichever one of the shaft or the bore that is not inhibited from rotating, urges the jaws together, and rotation in the opposite direction allows the jaws to move apart.

The bracket is not limited to such an arrangement and other means for controlling the spacing of the jaws may be substituted therefor as would be apparent to those skilled in the art.

Preferably, the second axis is substantially parallel to the main axis of the shaft. More preferably, the second axis is substantially aligned with the main axis of the shaft.

According to some embodiments, there is provided a crossbar assembly for a roof rack, the crossbar assembly including a crossbar having first and second ends; and first and second brackets according to the first aspect, wherein the crossbar housing of the first bracket is configured to engage the first end of the crossbar and the crossbar housing of the second bracket is configured to engage the second end of the crossbar, and wherein the rail engaging means of each bracket is configured to engage a corresponding rail, such that the crossbar is held and supported at each end to a rail via the crossbar housing in each bracket.

Preferably, the crossbar assembly comprises a contoured surface configured to engage the second jaw, the point of engagement defining at least one pivot, namely the first axis, about which the second jaw may rotate relative to the first jaw.

Preferably, the contoured surface comprises at least one slot, ridge or groove.

More preferably, the contoured surface comprises a plurality of substantially parallel slots, ridges or grooves.

Preferably, the at least one or each slot, ridge or groove is arcuate. This enables the second jaw to readily pivot about the second axis.

Preferably, the contoured, surface is provided on a surface of the crossbar. Alternatively, the contoured surface may be provided on an insert that is adapted to couple to the surface of the crossbar.

In addition to better defining pivot points for the second jaw, the ridges or grooves increase the strength of the bracket and crossbar assembly by improving resistance to buckling of the crossbar while under load.

According to some embodiments, there is provided a roof rack comprising a bracket as described herein and/or a crossbar assembly as described herein.

The term "roof rack" as used herein should be interpreted to include the similar term "load carrier".

Similarly, the term "crossbar" is to be interpreted broadly to include a strut/member/assembly configured to span between rails or other fixtures, particularly on a vehicle roof, but not limited to being on a vehicle roof.

The term "relevant vehicle" means the vehicle to which a user intends to attach a roof rack.

The term "effective length of the crossbar" refers to the length of the crossbar between the brackets of the roof rack.

The term "comprising" as used in this specification and claims should be interpreted to mean "consisting at least in part of" or "comprising". That is, when interpreting independent claims comprising that term, the features prefaced by that term in each claim all need to be present but other features can also be present. Variants, such as "comprised" and "comprises" are to be interpreted in the same manner.

BRIEF DESCRIPTION OF THE DRAWINGS

Further aspects of the embodiments described herein will become apparent from the following description, which is given by way of example only and with reference to the accompanying drawings, in which.

DETAILED DESCRIPTION OF PREFERRED EMBODIMENTS

Embodiments described herein relate to a bracket for coupling a crossbar to roof rack rails.

Figure 1A:
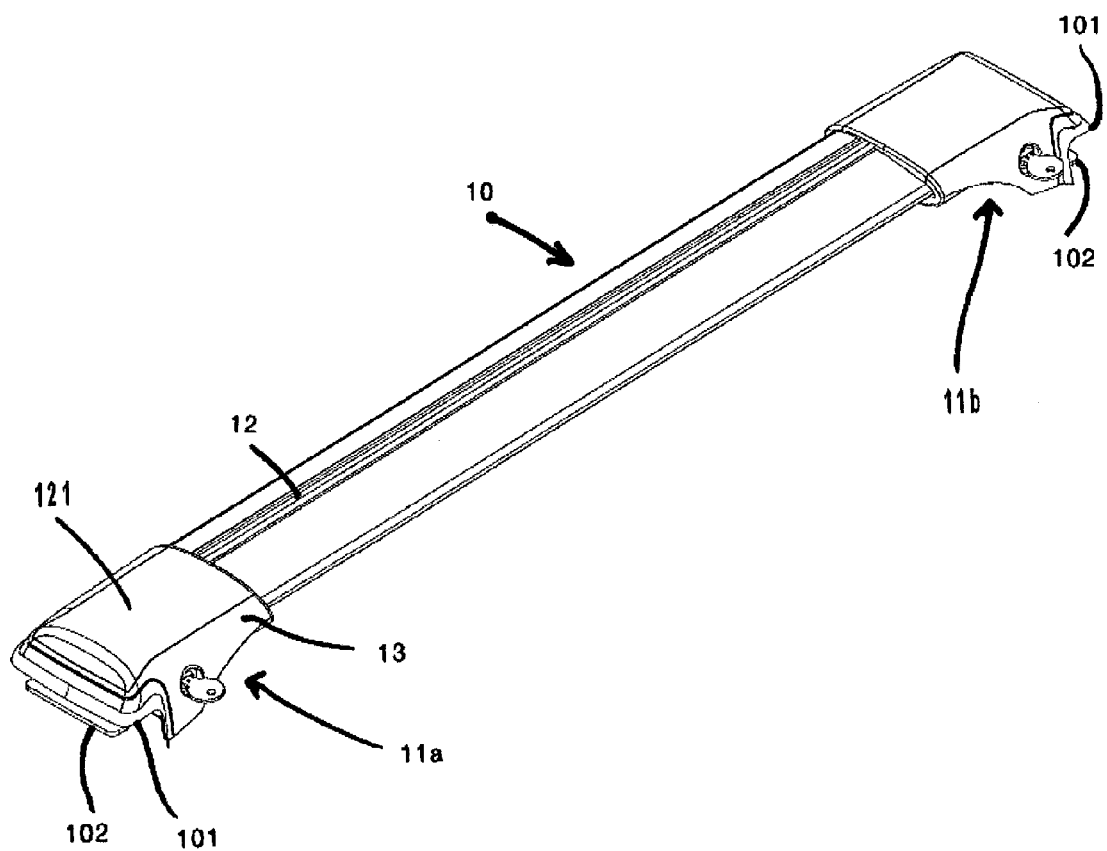
FIGS. 1a to 1c provide alternative views of a crossbar assembly according to some embodiments described herein.
Figure 1B:
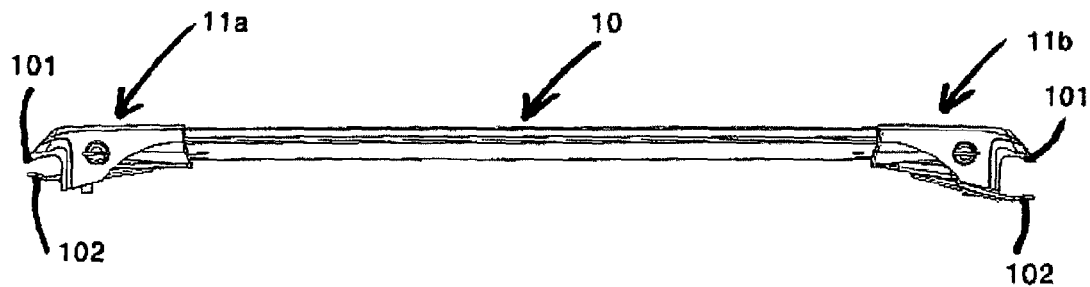
Figure 1C:
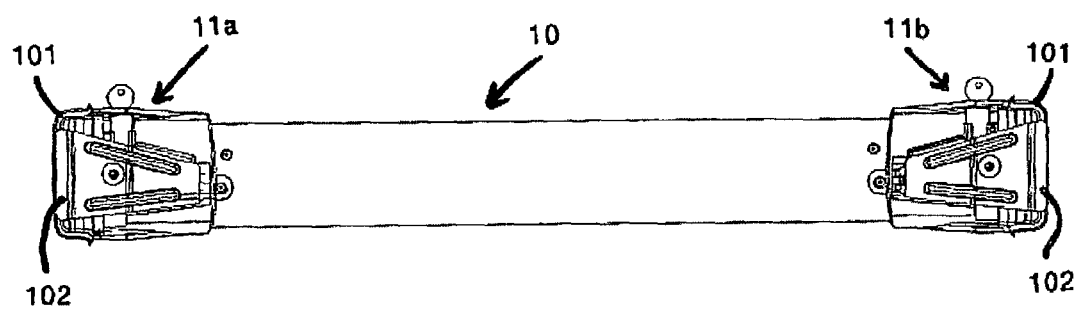

FIGS. 1a, 1b and 1c show alternative views (perspective, rear elevation and underside views, respectively) of an assembly according to some embodiments described herein. The assembly includes a crossbar 10 provided with first and second brackets 11a, 11b at each end thereof. The brackets 11a, 11b enable the crossbar 10 to be connected to first and second roof rack rails, respectively. A resilient infill 12 is provided within a passage in the crossbar 10.

Each of the brackets 11a, 11b is typically identical and only one will be described and shown in detail.

Figure 2A:
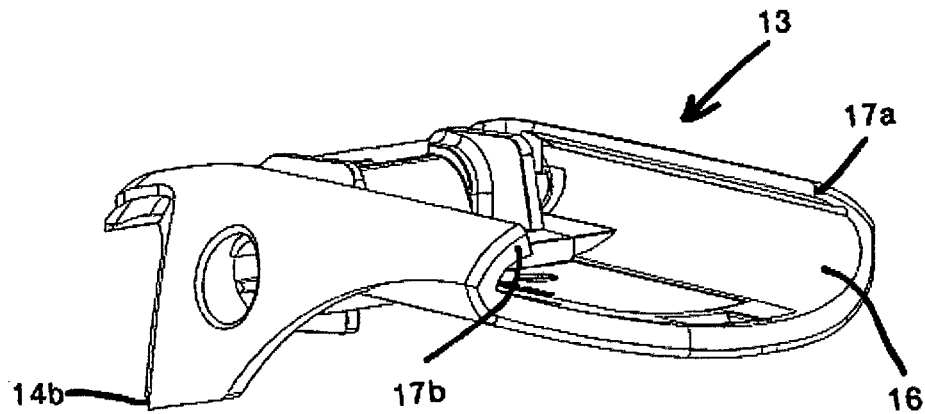
FIGS. 2a and 2b provide alternative views of a portion of a bracket according to some embodiments described herein.
Figure 2B:
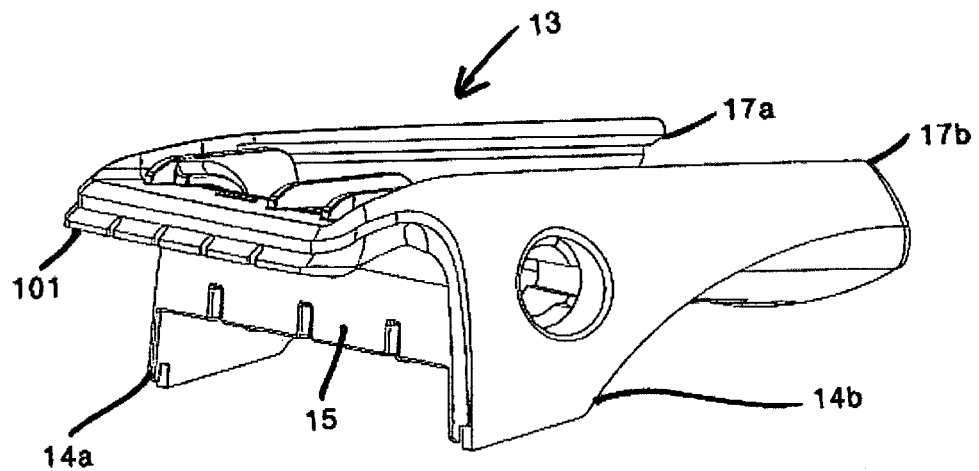

Bracket 11a includes a main body 13, which is shown more clearly in the perspective views of FIGS. 2a and 2b.

As shown in FIGS. 2a and 2b, the main body 13 comprises a base having a pair of supports 14a, 14b with a bridge 15 spanning the two. A crossbar housing 16 is positioned above the bridge 15. The crossbar housing 16 is shaped to allow for a crossbar having an aerodynamic end profile (such as that shown in FIG. 3) to be slid into the housing 16. The crossbar housing 16 holds and supports the crossbar 10, securing it to the first bracket 11a.

Although the form of the crossbar housing shown in FIG. 2a is shaped to hold and support a crossbar with an aerodynamic end profile, it is envisaged that the crossbar housing could be shaped to house and support a crossbar having a different transverse cross-sectional profile. Furthermore, it is not essential for the main body 13 to comprise a bridge. For example, it is alternatively envisaged the base of the main body 13 may have a continuous bottom edge.

Overhanging lips 17a and 17b are located at the top of the crossbar housing and act to prevent the crossbar from pulling upward out of the housing 13 when upward force is applied to the crossbar. The overhanging lips define an opening giving access to a longitudinal channel running substantially along the length of the crossbar. The opening and channel allow for equipment brackets (also known as accessory clamps) to be attached to the crossbar at one end, and slid along the channel of the crossbar between the lips of the crossbar housing. The equipment brackets are suitable for holding kayaks, bicycles, or the like to the roof rack.

Figure 3:
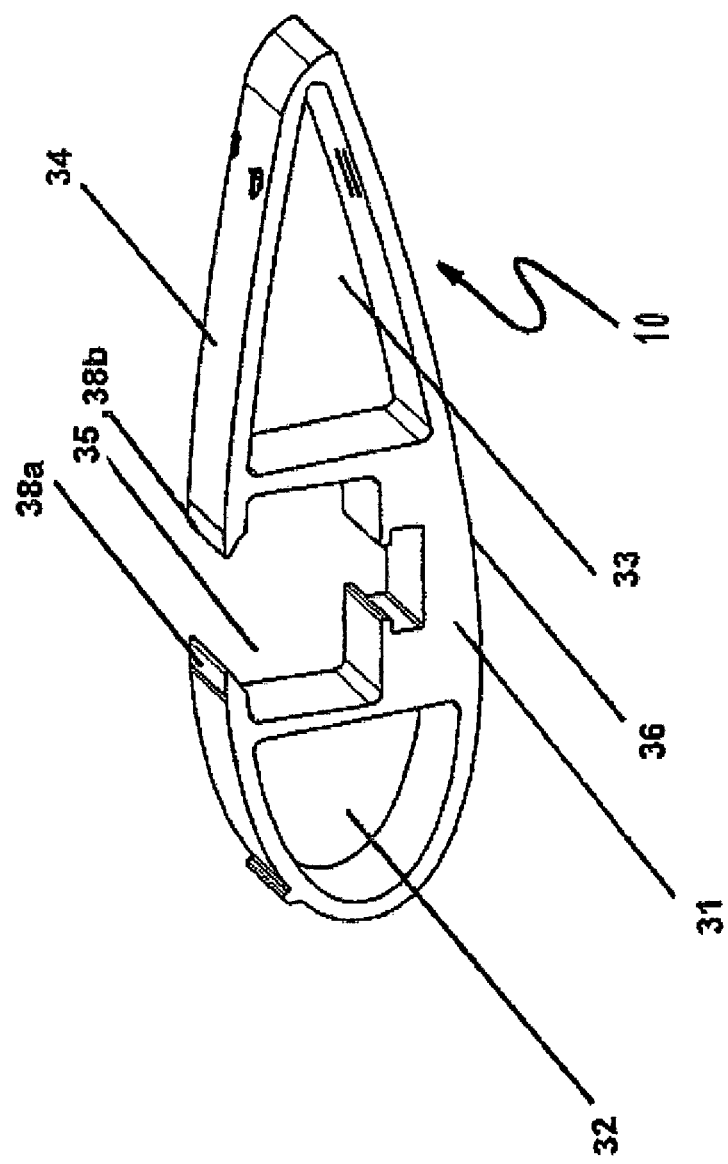
FIG. 3 is a perspective end view of a crossbar according to some embodiments described herein.

One form of crossbar for a roof rack according to embodiments described herein is shown in FIG. 3. The crossbar 10 has an aerodynamic external transverse cross-sectional profile. This profile can readily be seen by viewing the crossbar from one end. While not limited thereto, the interior of the crossbar is separated into three different portions: a core 31, a first cavity 32, and a second cavity 33. An infill channel 35, for receiving the resilient infill 12, is positioned in the core 31 and between the first and second cavities 32, 33. A pair of opposing lips 38a, 38b project across the infill channel, at the upper surface 34 of the crossbar.

Figure 4A:
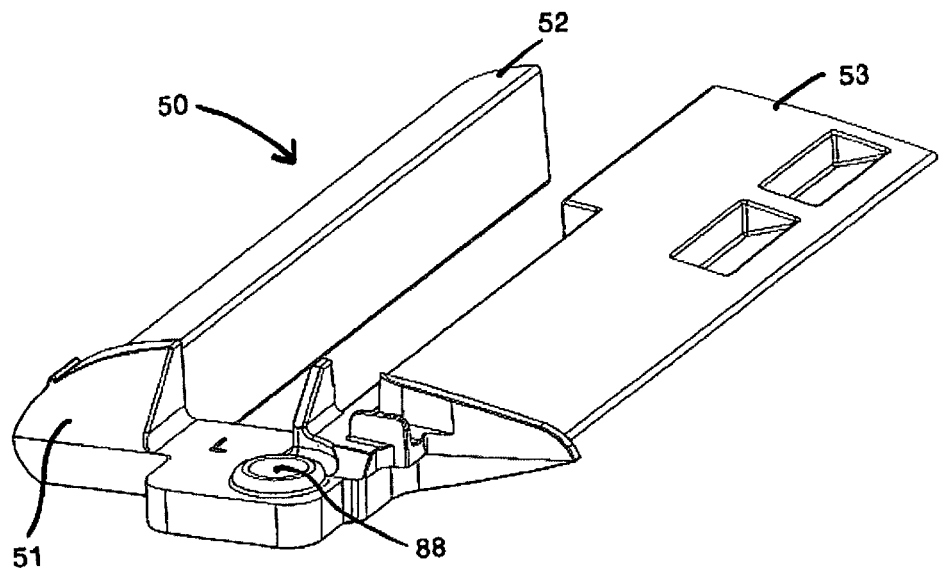
FIGS. 4a and 4b are alternative perspective views of a crossbar insert according to some embodiments described herein.
Figure 4B:
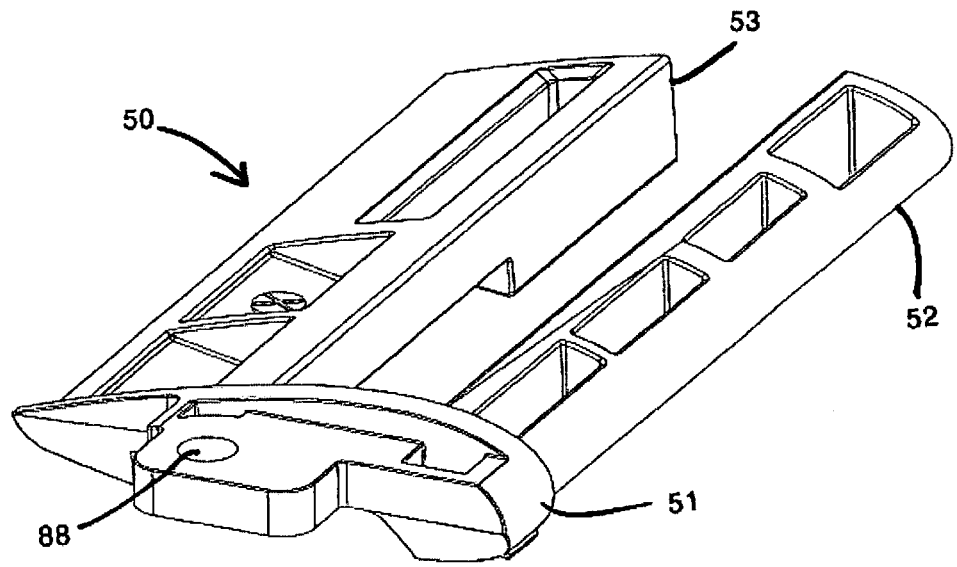

FIGS. 4a and 4b provide alternative perspective views of a crossbar insert 50 that acts as an extension means. The crossbar insert 50 comprises a support 51 having an end face and a contacting face.

First and second extension arms 52, 53 project from the contacting face of the support 51. The first and second arms 52, 53 have opposing inner faces that define a channel therebetween. Each of the first and second arms have a peripheral external surface that substantially corresponds with the inner surfaces of the first and second cavities 32, 33 in the crossbar respectively, so that the arms substantially mate with and fill the first and second cavities.

To attach the crossbar insert 50 to one end of the crossbar 10, the first and second extension arms 52, 53 are slid into the first and second cavities 32, 33 of the crossbar respectively. The core 31 of the crossbar 10, comprising the infill channel 35, is positioned within the channel of the crossbar insert 50. The arms 52, 53 are pushed into the crossbar 10 until the contacting face of support 51 abuts the end of the crossbar 10, thereby preventing the entire crossbar insert 50 from sliding within the crossbar 10.

The support 51 supports the arms 52, 53 and acts as a stop to prevent the entire crossbar insert 50 from being slid within the crossbar 10. Each extension arm should fit snugly within its respective cavity to prevent the arm from skewing relative to the cavity. The support 51 further includes an aperture 88 for supporting elements of the bracket, as will become apparent:

To allow the crossbar insert and crossbar to be properly held together in a roof rack according embodiments described herein, the crossbar and extension member are snugly housed within a respective bracket described herein. To easily allow the crossbar insert to be housed within a bracket of the roof rack, the end face of the support 51 has an external profile that is substantially the same size and shape as the external end profile of the crossbar 10 (that profile being viewed from an end of the crossbar).

Because the size and shape of the profile of the end face of the support 51 is substantially the same size as the external end profile of the crossbar 10, the crossbar insert is snugly housed within the crossbar housing 16 in the same way in which the crossbar 10 is housed within the housing 16.

Both the support 51 and crossbar 10 can be slid along the crossbar housing 16 in the longitudinal direction thereof, but the crossbar housing 16 prevents substantial sideways (or lateral) movement of the crossbar 10 and support 51 within the housing 16.

To increase the effective length of the crossbar in order to attach the crossbar to rails that are spaced apart at different distances, the first and second extension arms 52, 53 of the crossbar insert or extension means 50 are retracted from the first and second cavities 32, 33 of the crossbar so that only a portion of the extension arms remain with each of the first and second cavities. Thus, portions of the extension arms 52, 53 nearest the support 51 are now exposed. A cover 121 of the bracket is placed over the upper surfaces of the exposed extension arms and crossbar. The cover preferably has a similar profile to the upper surface of the crossbar. If the cover were not present, the exposed joint between the extension arms and crossbar would create significant and undesirable cavity noise as a vehicle bearing the roof rack moves. Thus, some embodiments described herein allow the effective length of the crossbar, whilst retaining a streamlined and low noise producing roof rack-system.

Furthermore, because the portions of the extension arms 52, 53 that remain within the first and second cavities of the crossbar are held snugly within these cavities, and because the support 51 of the extension means is held snugly within the crossbar housing and cover arrangement, the crossbar 10 and extension means 50 are prevented from skewing relative to the crossbar brackets 11*a*, 11*b*. Thus, some embodiments described herein also allow the effective length of the crossbar to be extended without compromising the strength of the join between the crossbar brackets and crossbar.

Referring again to FIG. 1*b*, in particular, the brackets 11*a*, 11*b* each include first and second jaws 101, 102 which are configured for fixing to a roof rack rail. According to the embodiment shown, each first jaw 101 is fixed in position with the corresponding second jaw 102 being movable relative thereto. In FIG. 1*b*, each second jaw 102 is shown in a different position. In the case of the bracket 11*a*, the configuration shown exemplifies a position of the jaws when the jaws 101, 102 are securely fitted around a rail, whereas for the bracket 11*b*, the configuration shown exemplifies a position of the jaws when introducing the bracket to, or removing it from, a rail.

Additional detail for first jaw 101 is provided in FIG. 2*b*.

Figure 5A:
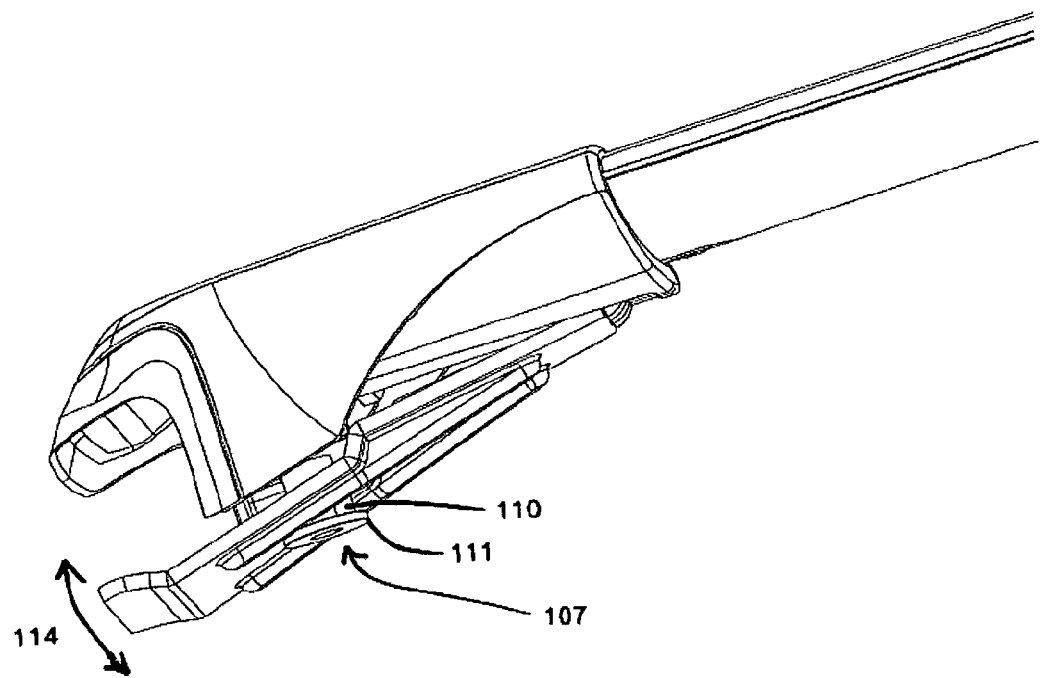
FIG. 5a is a perspective view of a portion of a crossbar assembly according to some embodiments described herein.
Figure 5B:
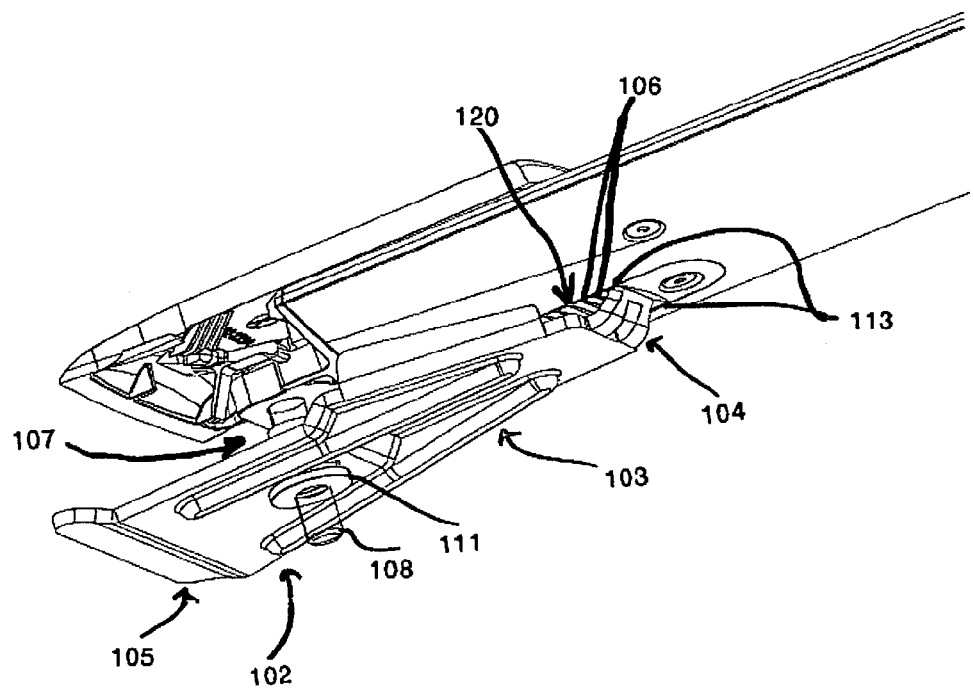
FIGS. 5b and 5c provide alternative views of the crossbar assembly of FIG. 5a with portions removed.
Figure 5C:
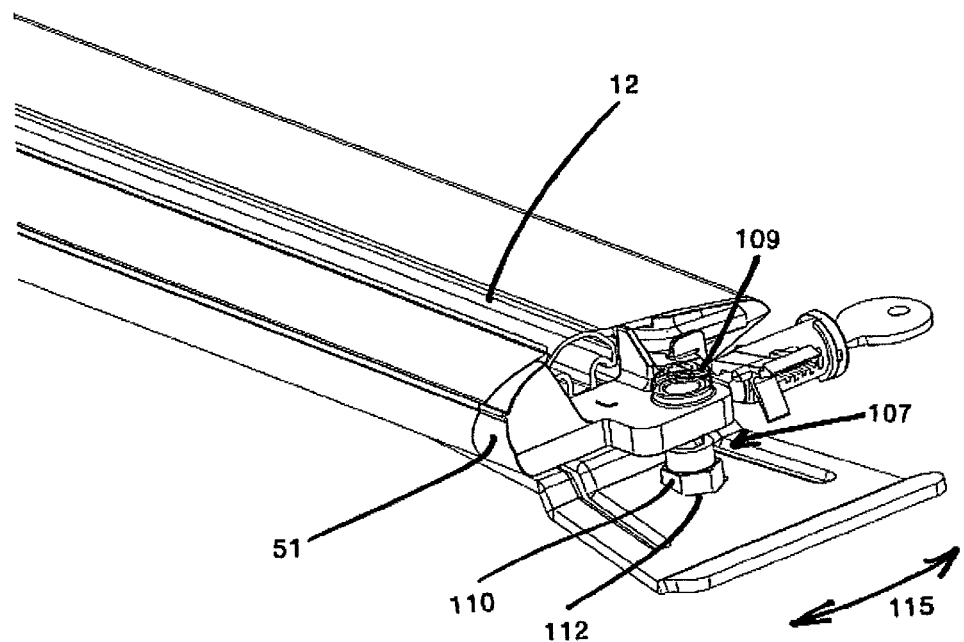

Further detail of the second jaw 102 and the preferred mechanism for urging the first and second jaws 101, 102 together are shown in FIGS. 5*a* to 5*c*. Some elements have been removed from FIGS. 5*b* and 5*c* to improve clarity. FIG. 5*c* further shows additional detail of the resilient infill 12 and how portions of the bracket are coupled to the support 51.

As shown most clearly in FIG. 5*b*, second jaw 102 includes a main body 103 having a first end 104 and a second end 105. The second end 105 is configured to cooperate with the opposing surface of the first jaw 101 to grip a rail by pivoting about the first end 104 which engages the underside of the crossbar.

While not limited thereto, according to preferred embodiments, the first end 104 is able to pivot about a plurality of different points. This is facilitated using a plurality of spaced apart slots, grooves or ridges 106 along the crossbar. One or more apertures may be provided in the base of the crossbar housing to facilitate the engagement of the first end 104 with the slots, grooves, or ridges 106 of the crossbar. Such an arrangement enables the spacing between the jaws 101, 102 to be varied by a greater extent.

A jaw adjustment mechanism 107 is provided to control the spading between the jaws 101, 102 and fix them around a rail during, use. The jaw adjustment mechanism 107 comprises a shaft 108 having a cap 109. At least a portion of the shaft 108 is provided with a thread which is configured to engage a corresponding thread on a nut 110 provided with a flange 111.

The cap 109 is configured to engage with a tool, in this case an allen key, so that the shaft 108 may be rotated. The nut 110 has an outer profile that corresponds to that of an aperture 112 provided in the body 103. Both the shaft 108 and nut 110 pass through the aperture 112.

The flange 111 limits movement of the second jaw 102 away from the first jaw 101. By rotation of the cap 109, nut 110 is urged away from or towards the cap 109 due to the action of the threads and the fact that rotation of the bolt is inhibited by the walls of aperture 112. Note that while the walls of aperture 112 closely match the nut 110, some tolerance is provided to permit the nut to move therein so as to accommodate the pivoting movement of the second jaw 102 as the jaws open and close, particularly for embodiments in which the first end 104 of the second jaw 102 is able to pivot about a plurality of points.

Through movement of the nut 110, the flange 111 either urges the second jaw 102 towards the first jaw 101 or allows the jaws to be spaced further apart. Thus, it is possible to clamp the jaws 101, 102 around a rail so as to affix a crossbar thereto. As would be apparent to those skilled in the art, nut 110 may be coupled to the second jaw 102 so as also to control movement thereof during opening so that the jaws are deliberately urged apart and not merely allowed to open. Note that during installation of the brackets (i.e., their connection to a rail), at least a portion of the upper housing thereof is removed to facilitate access to the cap 109.

Figure 6:
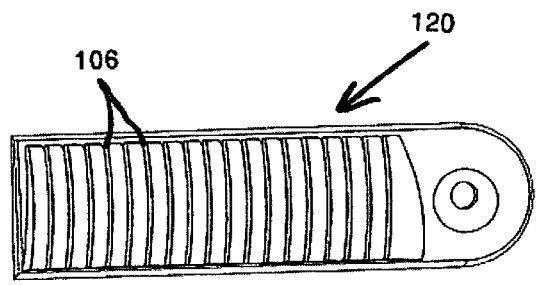
FIG. 6 is a plan view of an insert according to some embodiments described herein.

According to preferred embodiments, second jaw 102 is provided with some ability to rotate about the axis of shaft 108 to enable the brackets described herein to be used to connect a crossbar to rails that are not parallel. To achieve this, first end 104 is movable across the surface of the underside of the crossbar in an arc that has a centre point substantially at the centre of aperture 112. According to preferred embodiments, ridges or steps 113 limit the extent of this movement. Where slots, ridges or grooves 106 are provided, these are preferably formed to be arcuate as shown in FIG. 6 so as to facilitate the movement of first end 104 with a groove or against a ridge. The plural number of ridges or grooves, as shown, enable the contact point between the second jaw 102 and the lower surface of the crossbar to move to take account of the thickness of the rail to be held.

According to the embodiment of FIG. 6, the ridges or grooves 106 are provided on an insert 120 that is adapted to couple to the crossbar. The embodiments are not limited thereto and it will be apparent that the slots, ridges or grooves may be provided directly on the surface of the crossbar.

Thus, according to preferred embodiments, the second jaw 102 rotates as shown by arrows 114 and 115, thereby providing for improved flexibility in the types of rails with which the embodiments may be used.

Thus, preferred embodiments simplify the installation/removal process for roof rack crossbars in that a single fixing operation is required at each end of a crossbar. More particularly, the jaw adjustment mechanism 107 of the invention not only secures, the bracket to the rail but also the crossbar to the bracket, at least when a bracket has been fitted to a rail at each end of a crossbar.

While the present invention has been illustrated by the description of the embodiments thereof, and while the embodiments have been described in considerable detail, it is not the intention of the applicant to restrict or in any way limit the scope of the appended claims to such detail. For example, although the invention has been described with reference to a pair of arms, it is envisaged that the crossbar insert could comprise a single arm, or three or more arms, provided that the crossbar included corresponding cavities in which to house the arm(s).

Additional advantages and modifications will readily appear to those skilled in the art. Therefore, the invention, in its, broader aspects, is not limited to the specific details of the representative apparatus and method, and illustrative examples shown and described. Accordingly, departures may be made from such details without departure from the scope of the applicant's general inventive concept.

I claim:

1. A crossbar assembly comprising:
   a crossbar having a first end, a second end, a long axis, an underside, and a plurality of grooves on the underside, each groove of the plurality of grooves being generally perpendicular to the long axis; and
   a pair of brackets configured for coupling the first and second ends of the crossbar to a pair of rails on a vehicle, the pair of rails being generally perpendicular to the crossbar, each bracket having a crossbar housing for receiving and engaging one end of the crossbar, each bracket including first and second jaws, each jaw having a first end portion engaging one of the rails, the first jaw having a second end portion connected to the respective crossbar housing, the second jaw having a second end portion selectively engageable with any one of the plurality of grooves for selective translation of the first end portion of the second jaw in a direction parallel to the long axis of the crossbar.

2. The crossbar assembly of claim 1, wherein the grooves are spaced apart from one another on the underside of the crossbar in a direction parallel to the long axis of the crossbar.

3. The crossbar assembly of claim 1, wherein each bracket includes a jaw adjustment mechanism including a threaded shaft and a nut passable through an aperture defined in the respective crossbar housing, the aperture being oversized relative to the shaft and nut to accommodate pivoting movement of the second jaw about first and second pivot axes as the jaws are urged to clamp the respective rail, the first pivot axis being generally parallel to the respective rail, the second pivot axis being generally vertical and perpendicular to the respective rail and the long axis of the crossbar.

4. The crossbar assembly of claim 1, wherein the grooves are provided directly on a surface of the crossbar.

5. The crossbar assembly of claim 1, wherein the grooves are provided on an insert coupled to the underside of the crossbar.

6. The crossbar assembly of claim 2, wherein selective engagement of the second end portion of the second jaw with any groove of the plurality of grooves forms a substantially horizontal pivot axis about which the first end portion of the second jaw is pivotable relative to the first end portion of the first jaw.

7. The crossbar assembly of claim 6, wherein each groove of the plurality of grooves is curved to allow the second jaw to pivot about a substantially vertical pivot axis when the second end portion of the second jaw is engaged with any groove of the plurality of grooves, the substantially vertical pivot axis being substantially perpendicular to the substantially horizontal pivot axis.

8. A vehicle roof rack comprising:
   a crossbar having first and second end portions, a long axis extending between the first and second end portions, an underside, and a plurality of grooves on the underside, the plurality of grooves being spaced apart from one another in a direction parallel to the long axis, each groove of the plurality of grooves being generally perpendicular to the long axis;
   a first bracket including a crossbar housing for holding the first end portion of the crossbar, the first bracket including first and second opposing jaws, the second jaw being pivotable relative to the first jaw about a first pivot axis to clamp therebetween a first rail of a pair of rails connected to a roof of a vehicle, each of the rails being generally perpendicular to the long axis of the crossbar, a portion of the second jaw being selectively engageable with any one groove of the plurality of grooves to form the first pivot axis and permit the first pivot axis to be selectively moved in a direction parallel to the long axis; and
   a second bracket configured to couple the second end portion of the crossbar to a second rail of the pair of rails.

9. The vehicle roof rack of claim 8, wherein the portion of the second jaw is a first end portion of the second jaw, the first jaw including a first end portion connected to the crossbar housing, the first and second jaws each including respective second end portions configured to clamp the first rail therebetween, movement of the first end portion of the second jaw from one of the grooves of the plurality of grooves to another groove of the plurality of grooves being configured to adjust a displacement of the first bracket from the second end portion of the crossbar along the long axis.

10. The vehicle roof rack of claim 8, wherein each groove of the plurality of grooves is curved with a respective radius of curvature to allow the first pivot axis to pivot about a second pivot axis when the first end portion of the second jaw is engaged in any groove of the plurality of grooves.

11. The vehicle roof rack of claim 10, wherein the second pivot axis is substantially perpendicular to both the first pivot axis and the long axis.

12. The vehicle roof rack of claim 11, wherein the first pivot axis extends in a substantially horizontal direction and is substantially parallel to the first rail, the second pivot axis extending in a substantially vertical direction and being substantially perpendicular to the first rail.

13. The vehicle roof rack of claim 12, wherein the second jaw is configured to pivot about the first and second pivot axes when the second jaw is urged toward the first jaw to clamp the first rail.

14. A vehicle roof rack comprising:
   a crossbar having first and second end portions, and a long axis extending between the first and second end portions;
   a first bracket including a crossbar housing in which the first end portion of the crossbar is received, the first bracket including first and second opposing jaws for coupling the crossbar housing to a first rail of a pair of rails connected to a roof of a vehicle, the first jaw being connected to the crossbar housing, the first bracket including an actuator that when actuated moves the second jaw relative to the first jaw to clamp the first rail between the first and second jaws and secures the crossbar to the bracket;

a second bracket configured to couple the second end portion of the crossbar to a second rail of the pair of rails;
wherein the crossbar includes an underside, and the actuator being configured to pivot the second jaw relative to the first jaw about a first pivot axis to clamp the first rail, the vehicle roof rack further comprising an adjustment mechanism including a plurality of grooves on the underside, the grooves being spaced apart from one another in a direction generally parallel to the long axis, each groove of the plurality of grooves extending in a direction generally perpendicular to the long axis, the second jaw being selectively engageable with any one groove of the plurality of grooves to form the first pivot axis.

15. The vehicle roof rack of claim 14, wherein manipulation of the actuator from an unclamped position to a clamped position causes the bracket to transition from a mobile mode to an immobile mode relative to the long axis of the crossbar.

\* \* \* \* \*